US011940958B2

(12) United States Patent
Franceschini et al.

(10) Patent No.: US 11,940,958 B2
(45) Date of Patent: Mar. 26, 2024

(54) ARTIFICIAL INTELLIGENCE SOFTWARE MARKETPLACE

(71) Applicant: International Business Machines Corporation, Armonk, NY (US)

(72) Inventors: Michele M. Franceschini, White Plains, NY (US); Ashish Jagmohan, Irvington, NY (US); Kanthi Sarpatwar, Elmsford, NY (US); Karthikeyan Shanmugam, Elmsford, NY (US); Roman Vaculin, Bronxville, NY (US)

(73) Assignee: International Business Machines Corporation, Armonk, NY (US)

( * ) Notice: Subject to any disclaimer, the term of this patent is extended or adjusted under 35 U.S.C. 154(b) by 829 days.

(21) Appl. No.: 15/922,020

(22) Filed: Mar. 15, 2018

(65) Prior Publication Data
US 2019/0287027 A1   Sep. 19, 2019

(51) Int. Cl.
*G06F 16/18* (2019.01)
*G06F 16/13* (2019.01)
(Continued)

(52) U.S. Cl.
CPC ........ *G06F 16/1837* (2019.01); *G06F 16/137* (2019.01); *G06F 16/1805* (2019.01);
(Continued)

(58) Field of Classification Search
CPC ............. G06F 16/1837; G06F 16/1805; G06F 16/137; G06F 16/1865
See application file for complete search history.

(56) References Cited

U.S. PATENT DOCUMENTS 8,595,154 B2 * 11/2013 Breckenridge ........ G06N 20/00
706/12
8,868,767 B2 * 10/2014 Thomas ............. G06Q 30/0643
709/229
(Continued)

FOREIGN PATENT DOCUMENTS

CN         108491266 B   * 11/2021  ............. G06F 16/27

OTHER PUBLICATIONS

M. Swan, "Blockchain Thinking : The Brain as a Decentralized Autonomous Corporation [Commentary]," in IEEE Technology and Society Magazine, vol. 34, No. 4, pp. 41-52, Dec. 2015 (Year: 2015).*

(Continued)

*Primary Examiner* — Brittany N Allen

(57) ABSTRACT

An example operation may include one or more of generating a hashed summary including hashes of one or more of a validation data set and hashes of data points chosen in previous iterations from producer nodes, and exposing the hashed summary to a plurality of producer nodes, receiving, iteratively, a plurality of requests from the plurality of producer nodes, respectively, where each request identifies a marginal value provided by a hash of a data sample available to a producer node, selecting a request received from a producer node based on a marginal value associated with the request, retrieving hashed data of the producer node associated with the selected request, and aggregating the hashed data of the producer node with the summary of hashes generated at one or more previous iterations to produce an updated summary, and storing the updated summary via a data block of a distributed ledger.

16 Claims, 10 Drawing Sheets

(51) Int. Cl.
*G06F 16/182* (2019.01)
*H04L 9/06* (2006.01)
*H04L 9/00* (2022.01)

(52) U.S. Cl.
CPC ........ *G06F 16/1865* (2019.01); *H04L 9/0643*
(2013.01); *H04L 9/50* (2022.05)

(56) References Cited

U.S. PATENT DOCUMENTS

| | | | |
|---|---|---|---|
| 9,563,854 B2* | 2/2017 | Cruz Mota | G06F 21/577 |
| 10,560,272 B2* | 2/2020 | Yang | H04L 9/0618 |
| 11,334,817 B2* | 5/2022 | Wang | G06F 16/27 |
| 11,562,230 B2* | 1/2023 | Mohassel | G06N 3/045 |
| 2016/0307113 A1* | 10/2016 | Calapodescu | G06F 16/35 |
| 2016/0335533 A1* | 11/2016 | Davis | G06F 9/44 |
| 2017/0031676 A1* | 2/2017 | Cecchetti | H04L 9/3236 |
| 2017/0054611 A1* | 2/2017 | Tiell | H04L 43/0876 |
| 2017/0169358 A1* | 6/2017 | Choi | G06F 16/9535 |
| 2018/0018590 A1* | 1/2018 | Szeto | G06F 21/6254 |
| 2018/0176229 A1* | 6/2018 | Bathen | H04W 12/106 |
| 2018/0198800 A1* | 7/2018 | Krasser | G06N 20/00 |
| 2018/0316502 A1* | 11/2018 | Nadeau | H04L 9/0637 |
| 2019/0004789 A1* | 1/2019 | Mills | G06F 8/36 |
| 2019/0012249 A1* | 1/2019 | Mercuri | G06F 9/451 |
| 2019/0164140 A1* | 5/2019 | Pasupula | G06Q 20/065 |
| 2019/0236559 A1* | 8/2019 | Padmanabhan | G06F 21/64 |
| 2020/0280447 A1* | 9/2020 | Snow | H04L 9/3247 |
| 2021/0328804 A1* | 10/2021 | Snow | H04L 9/0637 |

OTHER PUBLICATIONS

Hossein Shafagh, Lukas Burkhalter, Anwar Hithnawi, and Simon Duquennoy. 2017. Towards Blockchain-based Auditable Storage and Sharing of IoT Data. In Proceedings of the 2017 on Cloud Computing Security Workshop (CCSW '17). Association for Computing Machinery, New York, NY, USA, 45-50. (Year: 2017).*

Kuo TT, Ohno-Machado L. Modelchain: Decentralized privacy-preserving healthcare predictive modeling framework on private blockchain networks. Feb. 6, 2018. (Year: 2018).*

Hemang Subramanian. 2017. Decentralized blockchain-based electronic marketplaces. Commun. ACM 61, 1 (Jan. 2018), 78-84. (Year: 2018).*

Özyilmaz, Kazim Rifat, M. Doğan and A. Yurdakul. "IDMOB: IoT Data Marketplace on Blockchain." 2018 Crypto Valley Conference on Blockchain Technology (CVCBT) (2018): 11-19. (Year: 2018).*

X. Xu et al., "The Blockchain as a Software Connector," 2016 13th Working IEEE/IFIP Conference on Software Architecture (WICSA), 2016, pp. 182-191, doi: 10.1109/WICSA.2016.21. (Year: 2016).*

Gilson, Ben Goertzel on How Blockchain Can be Used to Decentralize Artificial Intelligence, cointelegraph.com, Oct. 20, 2017 (Year: 2017).*

Butcher, SingularityNET's Ben Goertzel has a grand vision for the future of AI, TechCrunch, Dec. 22, 2017 (Year: 2017).*

Corea, The Convergence of AI and Blockchain_ What's the deal, medium, Dec. 1, 2017 (Year: 2017).*

A. Aghasaryan, M. Bouzid, D. Kostadinov, M. Kothari and A. Nandi, "On the Use of LSH for Privacy Preserving Personalization," 2013 12th IEEE International Conference on Trust, Security and Privacy in Computing and Communications, 2013, pp. 362-371, doi: 10.1109/TrustCom.2013.46. (Year: 2013).*

Venkateswara, Hemanth, et al. "Deep hashing network for unsupervised domain adaptation." Proceedings of the IEEE conference on computer vision and pattern recognition. 2017. (Year: 2017).*

Li, Chengtao, et al. "Distributional adversarial networks." arXiv preprint arXiv:1706.09549 (2017). (Year: 2017).*

* cited by examiner

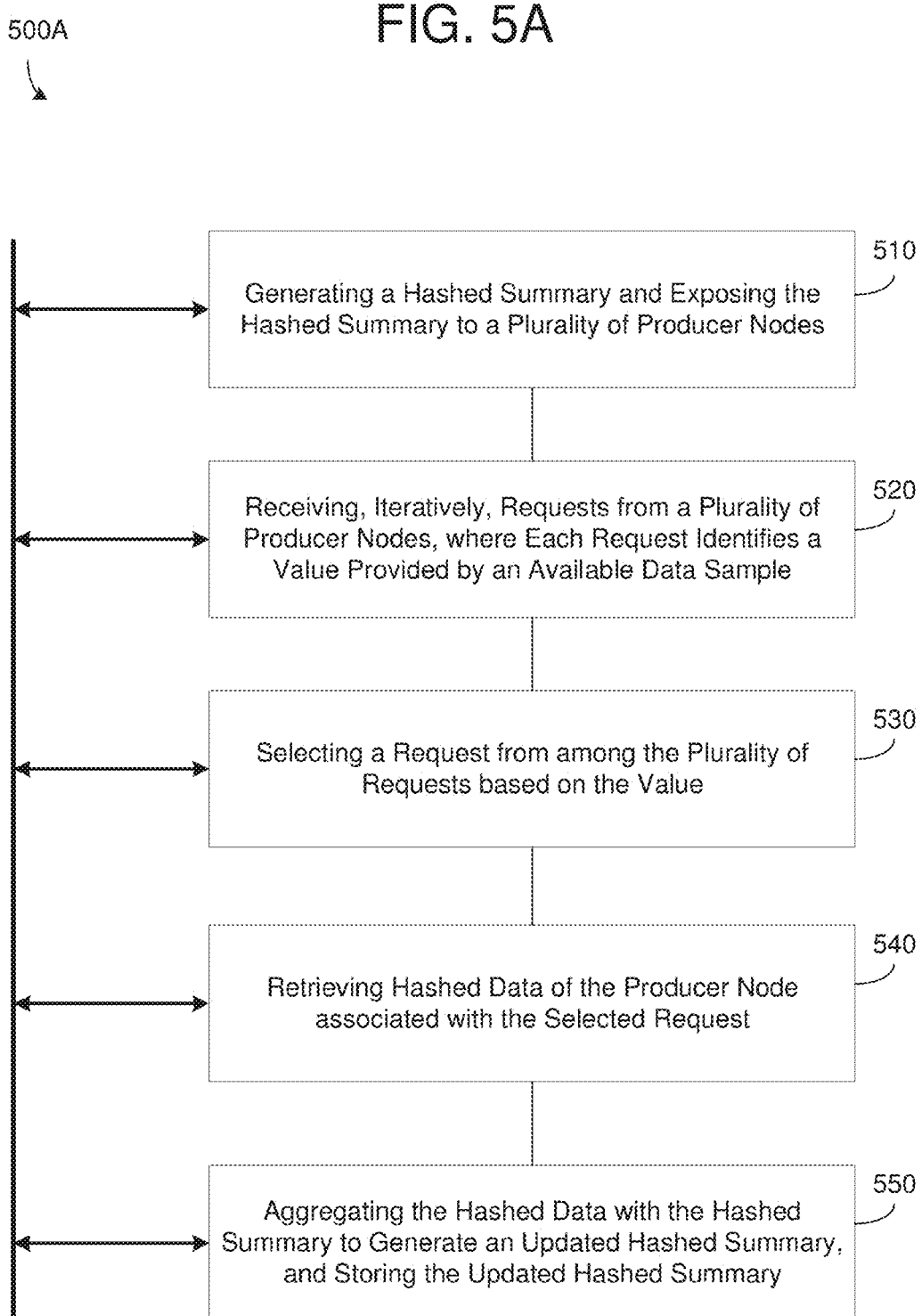

600A

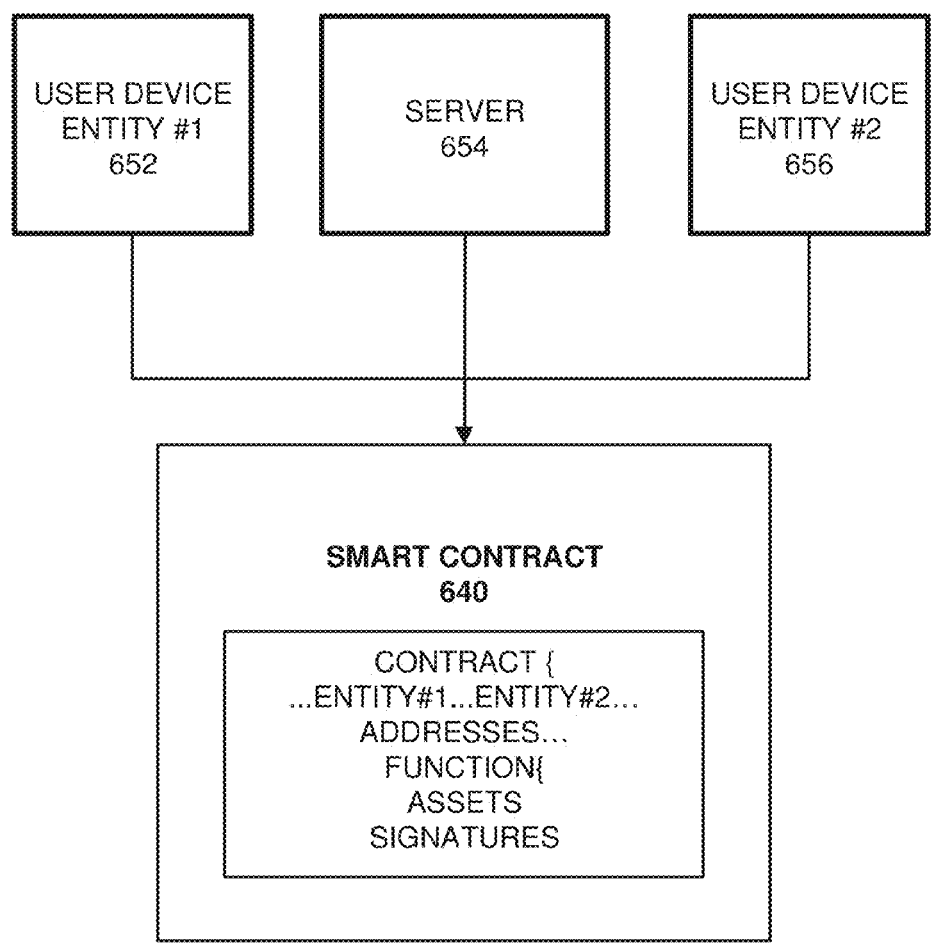

US 11,940,958 B2

ARTIFICIAL INTELLIGENCE SOFTWARE MARKETPLACE

TECHNICAL FIELD

This application generally relates to a digital marketplace for composing artificial intelligence (AI) software, and more particularly, to a marketplace implemented via a distributed ledger which enables hashed data from different entities to be used to generate an AI product without divulging the underlying data.

BACKGROUND

A distributed ledger is a continuously growing list of records that typically applies encryption techniques such as storing hashes of data. A blockchain is one common instance of a distributed ledger and may be used as a public or private ledger to store information. Although, primarily used for financial transactions, a blockchain could also be used to store various information related to goods and services (i.e., products, packages, status, etc.). A decentralized scheme provides authority and trust to a decentralized network and enables its nodes to record their transactions on a "block", creating a unique "chain" referred to as a blockchain. Hash codes may be used to secure an authentication of a transaction source and remove a central intermediary. The distributed ledger may include a database or other data storage means that maintains a continuously-growing list of records in the blockchain blocks, which are secured from tampering and revision due to their immutable properties. In some cases, the blocks may be linked to one another or they may be separate. Blockchain can be used to hold, track, transfer and verify information.

Conventionally, generating artificial intelligence (AI) software models and code requires a large, complex, and often proprietary data set that is accumulated over significant amounts of time by an entity that wants to build the AI software. The more historical data that can be acquired and used the better AI software becomes because it provides more information from which to learn. However, when entity does not have enough historical data available for composing their own models, the consumer must resort to off-the-shelf software which is often not narrowly tailored to the entity's needs, or the entity must forego the use of AI software altogether. Accordingly, what is needed is a new system for enabling AI product development for an entity even in situations where entity data is incomplete or unavailable.

SUMMARY

One example embodiment may provide a method that includes one or more of generating a hashed summary including hashes of one or more of a validation data set and hashes of data points chosen in previous iterations from producer nodes, and exposing the hashed summary to a plurality of producer nodes, receiving, iteratively, a plurality of requests from the plurality of producer nodes, respectively, where each request identifies a marginal value provided by a hash of one or more data samples available to a producer node, selecting a request received from a producer node from among the plurality of requests based on a marginal value associated with the request, retrieving hashed data of the producer node associated with the selected request, and aggregating the hashed data of the producer node with the summary of hashes generated at one or more previous iterations to produce an updated summary, and storing the updated summary via a data block of a distributed ledger.

Another example embodiment may provide a system that includes one or more of a network interface configured to communicate with nodes in a network, and a processor configured to one or more of execute one or more iterations, each iteration comprising generating a summary from one or more of a hashed validation data set received from a consumer node and hashes of data points chosen in previous iterations from producer nodes, exposing the hashed summary to a plurality of producer nodes, receiving, in response to the exposed hashed summary, a plurality of requests from the plurality of producer nodes, where each request identifies a marginal value provided by the hash of one or more data samples available to a respective producer node, and selecting a request of a producer node from among the received requests, and retrieving hashed data of the producer node associated with the selected request, wherein the processor is further configured to aggregate the hashed data of the producer node with summaries generated in previous iterations, to generate an updated summary, and store the updated summary via a data block of a distributed ledger.

A further example embodiment may provide a non-transitory computer readable medium comprising instructions, that when read by a processor, cause the processor to perform one or more of generating a hashed summary including hashes of one or more of a validation data set and hashes of data points chosen in previous iterations from producer nodes, and exposing the hashed summary to a plurality of the producer nodes, receiving, iteratively, a plurality of requests from the plurality of producer nodes, respectively, where each request identifies a marginal value provided by a hash of one or more data samples available to a producer node, selecting a request received from a producer node from among the plurality of requests based on a marginal value associated with the request, retrieving hashed data of the producer node associated with the selected request, and aggregating the hashed data of the producer node with the summary of hashes generated at one or more previous iterations to produce an updated summary, and storing the updated summary via a data block of a distributed ledger.

BRIEF DESCRIPTION OF THE DRAWINGS

FIG. 5A-5B are diagrams illustrating methods for generating an aggregated hash of data for an AI model, according to example embodiments.

FIG. 6B is a diagram illustrating a smart contract configuration among contracting parties and a mediating server configured to enforce smart contract terms on a blockchain, according to example embodiments.

DETAILED DESCRIPTION

Figure 1:
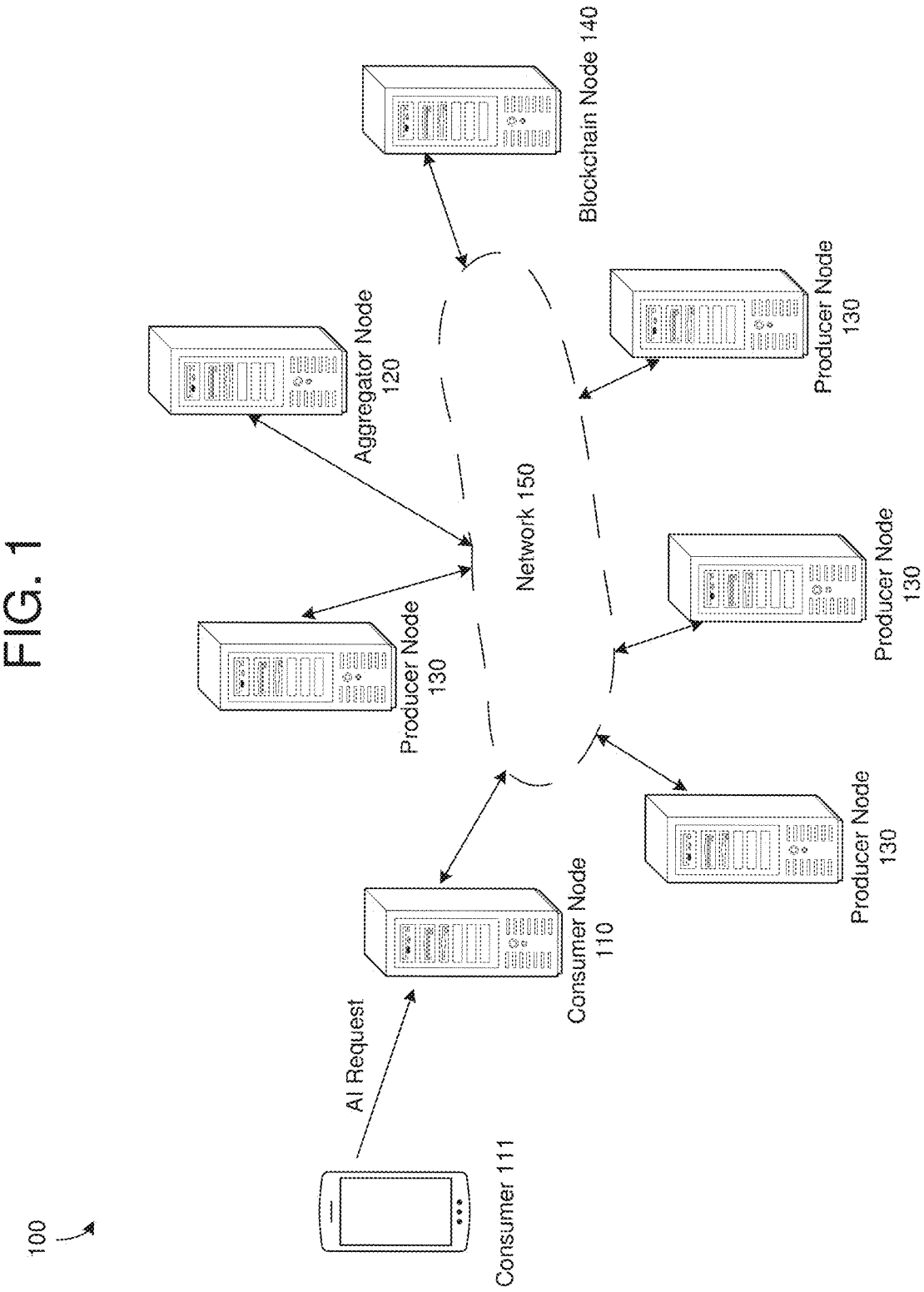
FIG. 1 is a diagram illustrating an AI marketplace network, according to example embodiments.

It will be readily understood that the instant components, as generally described and illustrated in the figures herein, may be arranged and designed in a wide variety of different configurations. Thus, the following detailed description of the embodiments of one or more of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems, which support a marketplace for composing artificial intelligence (AI) data and models. For example, a consumer that desires to generate an AI model may desire more proprietary data to build their own AI model. Unlike other assets, the utility of an AI asset increases with composition and may benefit from models of other entity's more than a traditional asset transfer. Therefore, the consumer may interact with the marketplace to obtain additional data/models to improve accuracy, efficiency, etc., of the AI model without having to generate the data on their own. However, proprietary data is sensitive (and often protected) data of clients, trade secrets, financial, and other types of data that should not be exposed to outside parties. The example embodiments can use a distributed ledger (e.g., a blockchain, etc.) that can keep the data hidden and secure while still enabling a model to be built.

According to various aspects, a consumer node may initiate a new artificial intelligence (AI) project by transmitting a request to an aggregator node, or otherwise exposing the request to the aggregator node via a blockchain. The request may include an initial data set of the consumer node (also referred to as a validation set) which is hashed and unreadable to the aggregator node, metadata of the desired software, and the like. The aggregator node may detect the new project request and also determine a type of software model desired by the consumer based on the metadata without actually being able to view the validation set. Examples of AI software including learning software that can predict future events (e.g., delivery route logistics, maintenance needs, loss in supply, increase in demand, etc.) The aggregator node generates a new entry on a blockchain for the new project or otherwise broadcasts a request to producing nodes capable of helping the consumer generate the AI software. The aggregator node may hash the data stored on the blockchain. According to various aspects, the hash function used by the aggregator node is different from the hash function used by the consumer. In addition, the hash function used by the aggregator node is also different from a hash function used by any of the producer nodes. In some embodiments, fine-grained access on who can access the hash may be provided by the system.

Producer nodes may own or otherwise control proprietary data that can be used to help compose the AI software but which may be proprietary in nature and not for exposure outside of the producer node. The aggregator node may share a locality preserving hash function and an improvement value determination function with each producer node. According to various aspects, a producer node may determine an amount of value that can be provided to the initial data set of the consumer based on the determination function provided from the aggregator node. The determined amount of value can then be submitted to the aggregator node in the form of a bid without requiring the producer node to submit any proprietary data. Each producer node may place a bid, and the aggregator node may select one or more bids based on a level of improvement in value added by the data of the producer node.

The winning producer node may be notified by the aggregator node. In response, the producer node may hash the data using the locality-preserving hash function which hides the underlying data while preserving the ability for the aggregator node to verify the improvement value. Examples of such a locality-preserving hash function include a kernel maximum mean discrepancy (MMD) function. Accordingly, the aggregator node can execute the improvement value determination function on the hashed data to determine an improvement value based on the hashed data received from the producer node. Furthermore, the aggregator node can verify that the improvement value provided in the request from the producer node is the equivalent to the improvement value determined from the hashed data. As will be appreciated, the locality-preserving hash is different from a typical cryptographic hash used on a blockchain. In particular, a cryptographic hash renders data completely encoded. Meanwhile, the locality-preserving hash may preserve enough information (metadata) of the underlying data (i.e., location between data points) that a level of improvement or value of the data can be determined.

When the hashed data is verified, the aggregator node can add the hashed data to the hashed summary include the initial data set, and repeat the process to solicit additional bids until the AI software model has enough data to be built. When the data has been gathered, the aggregator node can request each producer node that supplied hashed data to contribute in preparing the code for the AI software model based on the hashed data provided. When the AI software model is built, it can be provided to the consumer node.

According to various embodiments, the AI marketplace enables distributed composition (of models and data) with fair and trustable value attribution. Consumers may pick and combine (meta) models and data for their given need. In addition, producers may monetize models and data where more useful models may receive higher value. However, the design of the marketplace may enable the producers to monetize their data without actually divulging the data. A combination of locality preserving hash-exchanges and blockchain enables composition with value attribution. The system enables, simultaneously, consumers to determine how best to compose existing data/models, producers to be compensated for their AI assets used, and privacy of the consumer's and the producer's assets.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a consumer or submitting node which submits a request to build an AI asset to an aggregator. The aggregator may broadcast requests for building the AI asset to a producer nodes. Each node can be provided different rights and privileges within the blockchain network based on their assigned role.

A ledger is a sequenced, tamper-resistant record of all state transitions of a blockchain. State transitions may result from chaincode invocations (i.e., transactions) submitted by participating parties (e.g., consumer nodes, aggregator nodes, producer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which may be structured as hash-linked blocks, and each block contains a sequence of N transactions where N is equal to or greater than one. The block header includes a hash of the block's transactions, as well as a hash of the prior block's header. In this way, all transactions on the ledger may be sequenced and linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest state values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

FIG. 1 illustrates an AI marketplace network 100, according to example embodiments. Referring to FIG. 1, the AI marketplace network 100 includes a consumer node 110, an aggregator node 120, and a plurality of producer nodes 130, and a blockchain node 140. The blockchain node 140 may store a blockchain (not shown) that can be accessed by any of the other nodes in the network 100. Also, it should be appreciated that the blockchain may also or instead be stored on any of the consumer node 110, the aggregator node 120, the producer nodes 130, and the like. In the example of FIG. 1, the consumer node 110 may initiate a new project for composition via the AI marketplace network 100. Here, the request may be initiated locally or it may be initiated at the request of a client/consumer 111. The consumer node 110 may transmit an initial data set which has been hashed using a locality preserving hash function, and metadata of the initial data set and the type of AI asset desired by the consumer node. The hashed initial data set and the metadata may be stored in the blockchain stored by blockchain node 140 or transmitted directly to the aggregator node 120.

The aggregator node 120 may solicit bids from the plurality of producer nodes 130 through a broadcast blockchain request or through a transmission broadcast to the producer nodes 130 from the aggregator node 120. A producer node 130 may determine a value that can be added to the AI asset requested by the consumer node 110 based on respective data of the producer node 130. The producer node 130 may submit the value to be added to the aggregator node 120 as a bid. The aggregator node 120 may choose the winning bid, and notify a winning producer node. In response, the producer node 130 may submit a hashed data set to the aggregator node 120. The hashed data set may include proprietary data of the producer node 130 which is encoded by a locality-preserving hash that enables the aggregator node 120 to verify the value provided by the data of the producer node 130. Upon successful verification, the aggregator node may update the hashed initial data set and metadata stored on the blockchain (also referred to as an initial summary) with the hashed data of the winning producer node 130 to generate an updated summary. The aggregator node 120 may iteratively solicit additional bids from the producer nodes 130 until no more winning bids are left or some other condition such as the AI asset is completed, the expiration of period of time, etc.

Figure 2A:
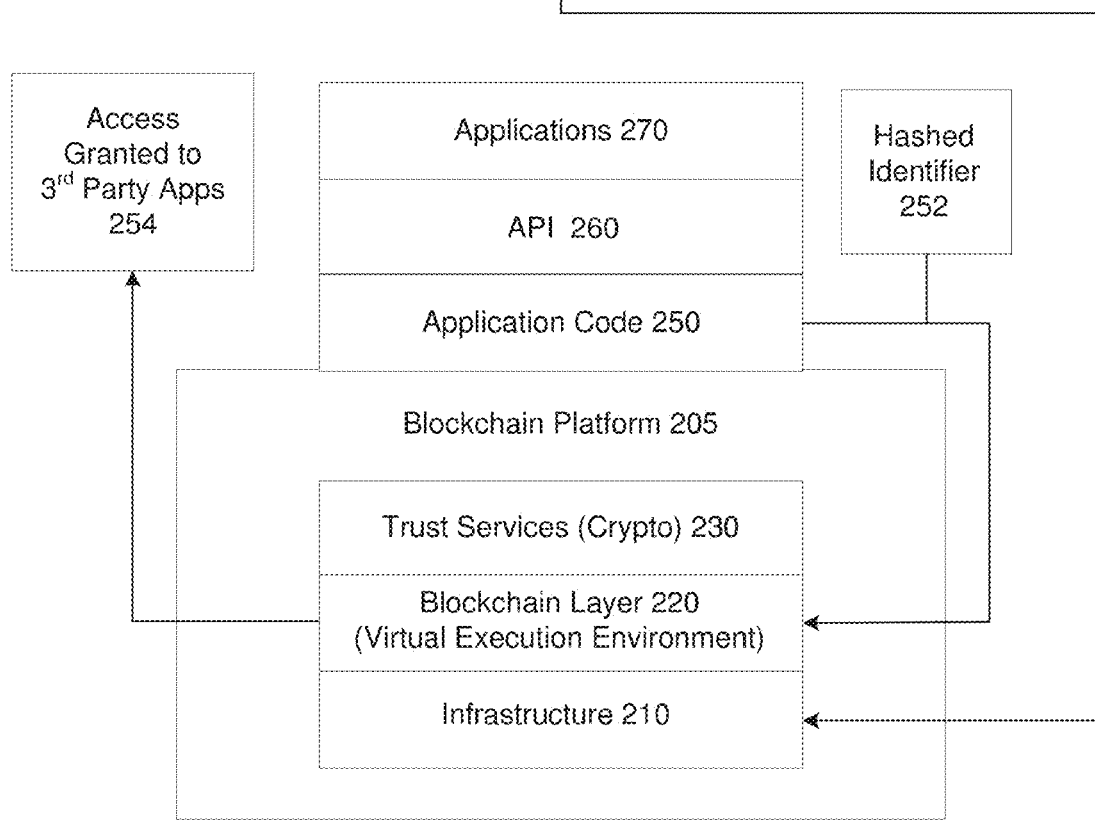
FIG. 2A is a diagram illustrating a peer node blockchain architecture configuration for an asset sharing scenario, according to example embodiments.

FIG. 2A illustrates a blockchain system architecture configuration 200A, according to example embodiments. Referring to FIG. 2A, blockchain architecture 200A may include certain blockchain elements, for example, a group 280 of blockchain nodes 281-284 which participate in blockchain transaction addition and validation process (consensus). One or more of the blockchain nodes 281-284 may request an AI asset and one or more blockchain nodes 281-281 may provide data and models for the AI asset in the architecture 200A. A blockchain node may initiate a blockchain AI asset project and seek to write to a distributed immutable ledger stored in blockchain layer 220, a copy of which may also be stored on the underpinning physical infrastructure 210. The blockchain configuration may include one or applications 270 which are linked to application programming interfaces (APIs) 260 to access and execute stored program/application code 250 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 281-284.

The blockchain base or platform 205 may include various layers of blockchain data, services (e.g., cryptographic trust services, virtual execution environment, etc.), and underpinning physical computer infrastructure that may be used to receive and store new transactions and AI assets (data and models) and provide access to auditors which are seeking to access data records stored in the ledger. The blockchain layer 220 may expose an interface that provides access to the virtual execution environment necessary to process the program code and engage the physical infrastructure 210. Cryptographic trust services 230 may be used to verify transactions such as asset exchange transactions and keep information private. However, in some embodiments, cryptography may not be used but rather locality-preserving hashes may instead be used.

The blockchain system architecture configuration 200A of FIG. 2A may process and execute program/application code 250 via one or more interfaces exposed, and services provided, by blockchain platform 205. The code 250 may control blockchain assets. For example, the code 250 can store and transfer data blocks, and may be executed by nodes 281-284 in the form of a smart contract and associated chaincode with conditions or other code elements subject to its execution. As a non-limiting example, smart contracts may be created to execute reminders, updates, and/or other notifications subject to the changes, updates, etc. According to various embodiments, smart contracts may also be used to execute distance-preserving hash functions on proprietary data, aggregate hashed data, perform improvement value determinations, and the like. The smart contracts can themselves be used to identify rules associated with authorization and access requirements and usage of the ledger. For example, hashed identifier information 252 received from a client device may be processed by one or more processing entities (e.g., virtual machines) included in the blockchain layer 220. The result may include access being granted 254 to a third-party application from the blockchain computing environment. In this example, the previously known user identifiers or data template information may be stored in the blockchain platform 205. The physical machines 210 may be accessed to retrieve the user device template and the information can be used to match against incoming user identifiers for verification purposes.

Within chaincode, a smart contract may be created via a high-level application and programming language, and then written to a block in the blockchain. The smart contract may include executable code which is registered, stored, and/or replicated with a blockchain (e.g., distributed network of blockchain peers). However, in some embodiments, a smart contract including customized endorsement logic may be unique to a node with respect to other nodes in a common blockchain network. A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In the example of FIG. 2A, the release and acquire smart contract information may be updated 222 according to the specifications of the entities providing asset services. One function may be to provide the requesting entity, in this example entity #2 with access 224 to the asset if the entity #2 has the correct credentials and the expiration date has not yet matured and is still in an active or pending status (i.e., before the expiration date). The correct credentials are required and the smart contracts conditions must be satisfied prior to releasing the asset access information.

Figure 2B:
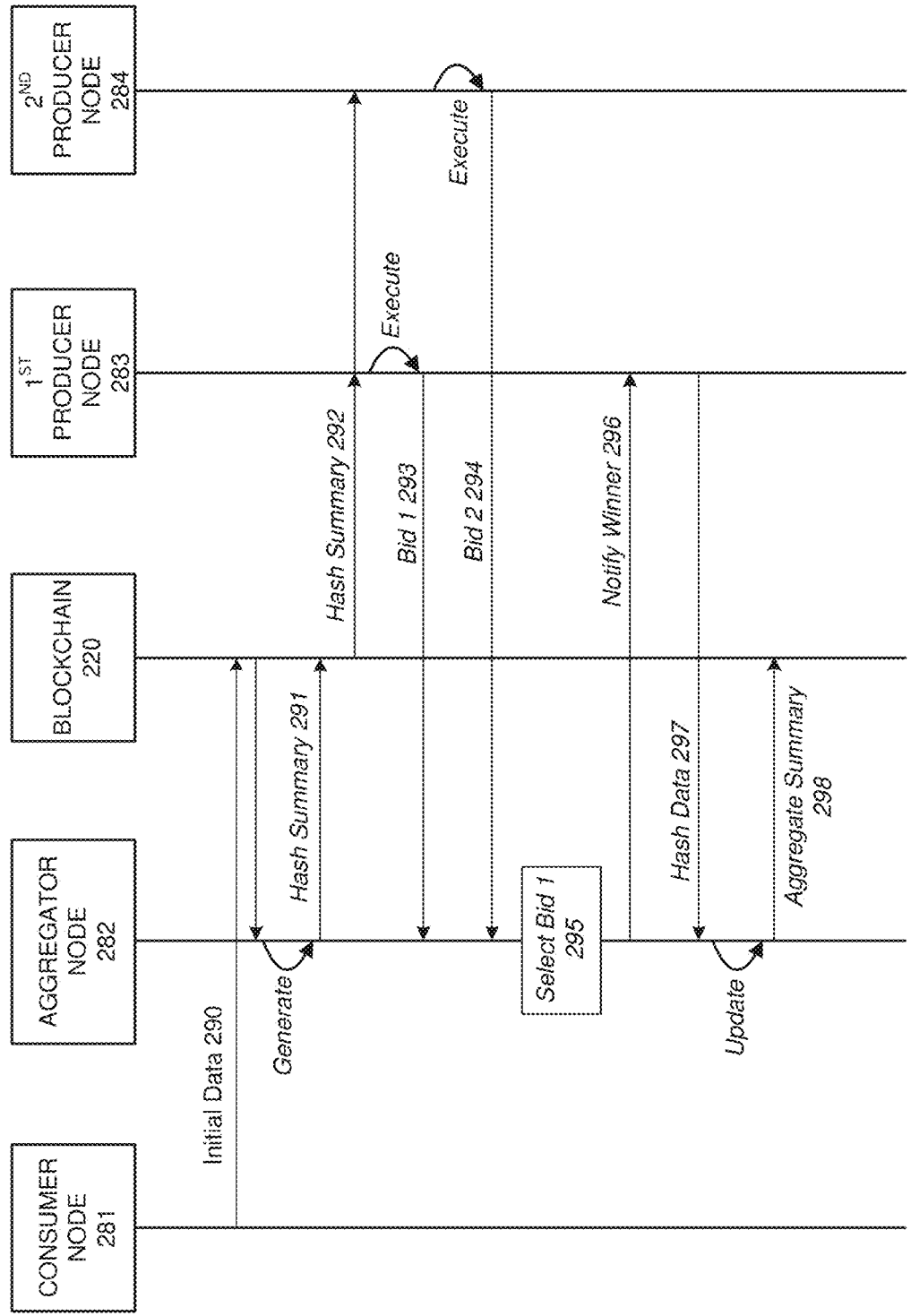
FIG. 2B is a diagram illustrating a communication sequence between blockchain nodes, according to example embodiments.

FIG. 2B illustrates a communication sequence 200B between blockchain nodes of an AI marketplace network, according to example embodiments. Referring to FIG. 2B, in 290, a consumer node 281 submits a request to start a new AI project along with a hashed initial data set of the consumer and metadata about the AI asset to be generated. The request may be stored on blockchain 220. In 291, an aggregator node 282 retrieves the hashed summary either directly from the consumer node 281 or from the blockchain 220, and generates a broadcast hash summary transaction on the blockchain 220. The hash summary may include the hashed initial data set, the metadata, and any other information about the AI asset. In this example, a first producer node 283 and a second producer node 284 detect the new project based on the broadcast hash summary transaction in 292, and execute an improvement value function on the hashed initial data to determine how much value data of a respective producer node can provide to the initial data set. Here, the improvement value may be determined based on how similar the producer data is to the consumer data.

In 293 and 294, the first and second producer nodes 283 and 284 submit their respective bids including value to be provided. The bids may be submitted directly to the aggregator node 282 or they may be stored on the blockchain 220 and detected by the aggregator node 282. The aggregator node 282 then selects a winning bid based on the improvement value of the different bids. For example, the aggregator node 282 may select a bid that provides the most improved value to the initial data set (which in this case is the bid 293 received from producer node 283). In response, the aggregator node 282 notifies the producer node 283. The producer node 283 may then generate a hash data set of its data using the locality-preserving hash which encodes the data while enabling an improvement value to be calculated/verified, and transmits the hashed data to either the aggregator node 282 or the blockchain 220, in 297.

In response, the aggregator node 282 verifies the improvement value provided from the producer node 283 within the bid 293 based on the hashed data received in 297, and updates the blockchain 220 to include the hashed data of the producer 283 when the improvement value is successfully verified. The aggregator node 282 may determine the improvement value based on a value determination function that is previously shared with the producer node to verify that the producer node correctly determined the value to be added. Because of the locality-preserving hash, the improvement value can be determined by the aggregator node from the hashed data of the producer node without actually being able to decode the underlying data.

Figure 3:
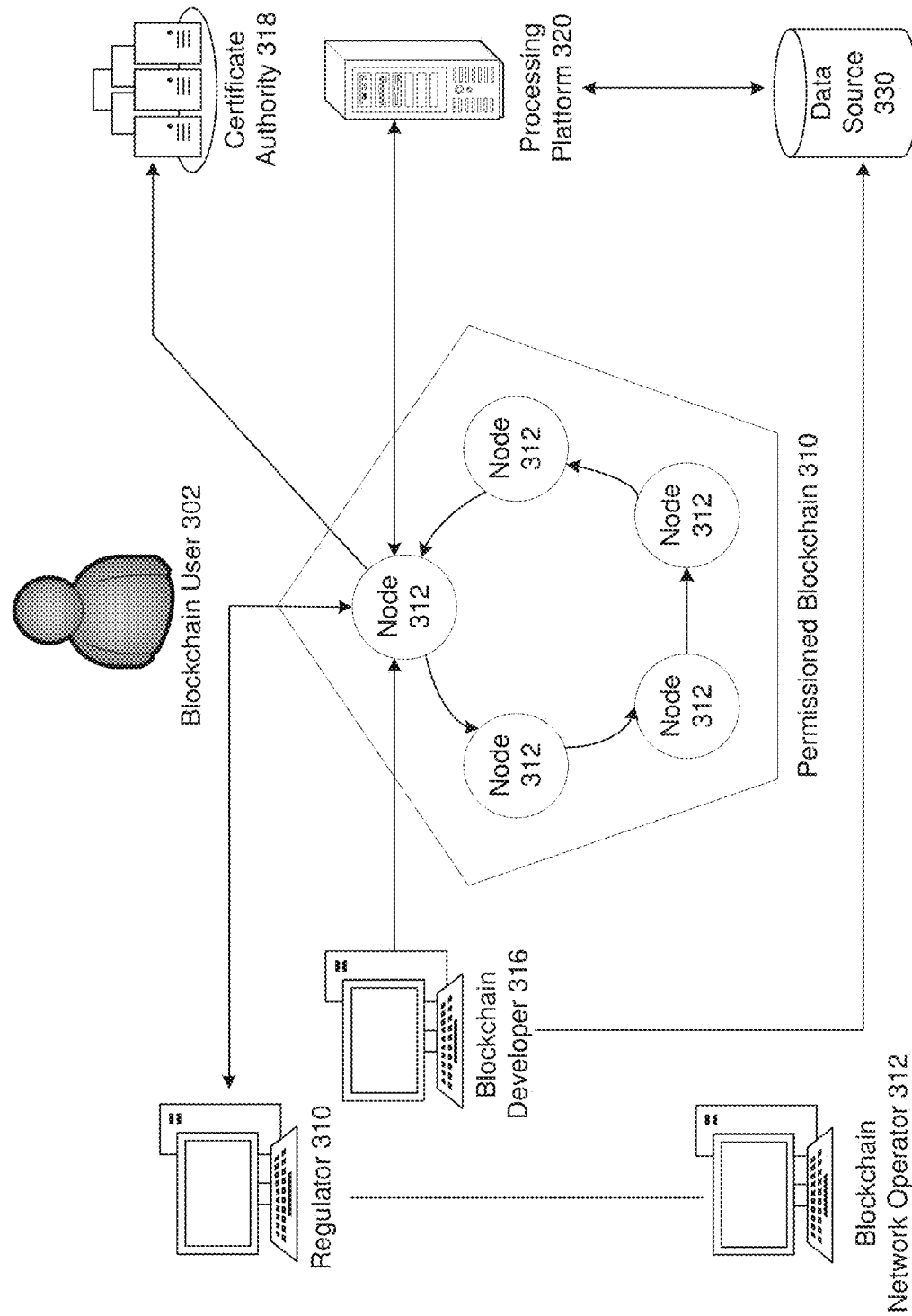
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction such as a request to compose a new AI model to the permissioned blockchain network 310. The transaction can be a deploy, invoke or query, and may be issued through a client-side application leveraging an SDK, directly through a REST API, or the like. Trusted business networks may provide access to regulator systems 310 such as auditors (the Securities and Exchange Commission in a U.S. equities market, for example). Meanwhile, a blockchain network operator system 311 manages member permissions such as enrolling the regulator system 310 as an "auditor" and the blockchain user 302 as a "client." An auditor could be restricted only to querying the ledger whereas a client could be authorized to deploy, invoke, and query certain types of chaincode. Furthermore, the blockchain network operator system 311 may designate one or more nodes 312 as consumer nodes, producer nodes, aggregator nodes, and the like.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a node 312. Before proceeding with any transactions, the node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

In the permissioned blockchain network 300, the participant nodes 312 are known and have verifiable identity within the network. The nodes 312 may communicate with one another and record its result with its unique signature. The unique signature is then verifiable by any other party/node on the network allowing for enforcement of endorsement policies. In contrast to a permission-less blockchain, the permissioned blockchain network 300 may allow only an admin of the nodes such as blockchain network operator 311 to deploy node roles. Hence, not any user can be an aggregator, a producer, or a consumer. Also, the nodes 312 in the permissioned blockchain network 300 may have different permissions.

Figure 4:
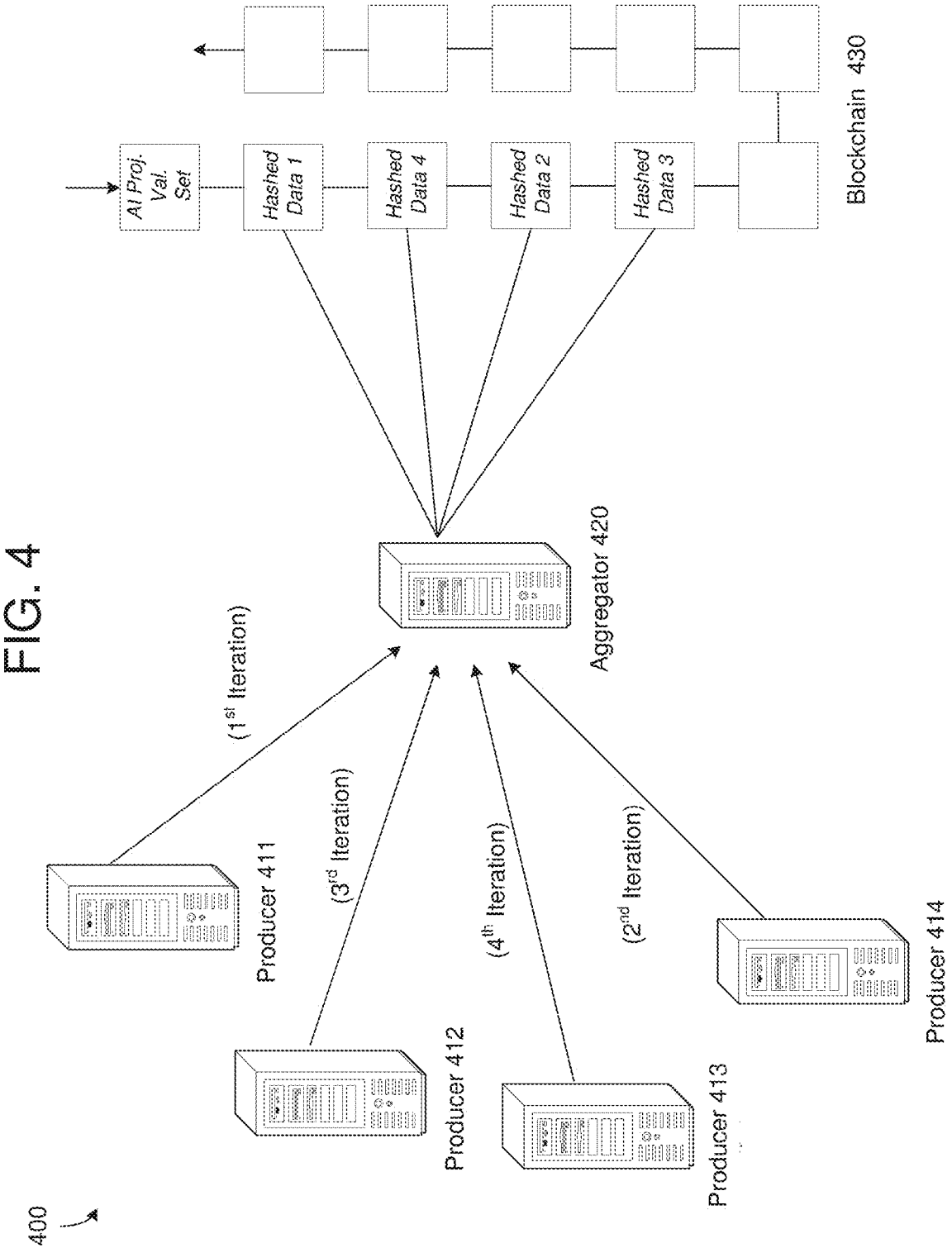
FIG. 4 is a diagram illustrating an iterative process of aggregating hashed data, according to example embodiments.

FIG. 4 illustrates an iterative process 400 of aggregating hashed data, according to example embodiments. In this example, respective data (e.g., local proprietary data) from four producer nodes 411-414 is aggregated together by an aggregator 420 during four iterations for use in composing an AI asset. In this example, producer nodes 411 may provide raw data such as supply chain data and models on the marketplace. However, these raw data/models are not for purchase directly but are instead offered as a service while preserving ownership over the data/models. A consumer entity may use the data offered as a service to create an AI model which may include a piece of code. The value of each data set may be determined by a marketplace protocol. Meanwhile, a consumer node may pay for the value attribution services provided by the platform shown in FIG. 4.

In this example, the marketplace may be a protocol implemented as a blockchain network (e.g., via Hyperledger Composer, etc.) The models, data and their hashed representations may be stored on a blockchain 430 with fine grained access control based on ownership. Bids from the producer nodes 411-414 may be stored as assets on the blockchain 430 and created via transactions between the producers 411-414 and the aggregator 420. Bid assets are subject to access constraints so that only the producer that generates it and the aggregator 420 can view them. The blockchain 430 may be accessed by any of the nodes in the system such as consumers, producers, and aggregators.

In operation, a consumer (not shown in FIG. 4) may initiate a new project by creating a new "create project" transaction. This transaction may create a new "AI project" asset on the blockchain 430 that contains the hash of its validation dataset and other metadata. Here, the hash of the validation data set may only be viewable by the aggregator node 420 and the consumer node, and not any producer nodes 411-414. The aggregator 420 may periodically pool for such assets and submit a "start project" transaction. Individual producers 411-414 can then join the project. In each iteration, the aggregator 420 may create a broadcast summary transaction that creates a "hashed summary" asset which includes a hashed representation of the summary (including the validation set of initial data from consumer) after each iteration. This asset can in turn be accessed by any of the producers 411-414 registered in the project (another transaction) who then submit bid transactions.

Bids are collected by the aggregator 420, which may choose the best one and submit a "winner transaction" identifying the producer from among the plurality of producers 411-414 with the best bid during that iteration. Finally, the winning producer submits a hashed data point transaction containing the hashed representation of the data point that gives an improvement corresponding to the bid value. The aggregator 420 then validates and records the hashed data point. In the example of FIG. 4, this process repeats for four iterations with each iteration adding a new block of hashed data of a respective producer to the blockchain 430. However, in some embodiments, the hashed data may not be stored in separate blocks but may be stored in a single block depending on implementation.

The hash used by the producing nodes 411-414 may be a specialized kernel-MMD based hash function or other locality-preserving hash function that allows producers to compute the value improvements of individual data points. This enables the producers 411-414 to share these improvements as bids, without sharing all the data hashes until they are purchased by the aggregator 420. While the summary is being created through numerous iterations, producer/consumer data is never shared directly, but only through hashed representations which may have differential privacy guarantees. As a result, the hashed summary or "prototype selection" is based only on hashed data that is never exposed between the different entities.

Subsequently, there are multiple ways to actually create a AI model using the summarized data. For example, the model may be trained over chosen points in the summary iteratively in a "round robin" fashion where in each producer 411-414 takes turn to refine the current model based on its hashed data that was purchased during the creation of the summary. This ensures that data never leaves owners and therefore data privacy is completely preserved. As another example, the chosen summary data points may be sent to a trusted destination which in turn trains the model.

In some embodiments, the network may employ two hash functions including h1 and h2. Both may be distance preserving kernel based functions and not regular crypto hash functions. The hashed summary (V*) may be a collection of h1 hashes of chosen data points from various producers 411-414 whose random seed is unknown to the aggregator 420 but shared among the producers 411-414 and consumers. The aggregator 420 may always expose the summary V* and Validation set (V1) only through another hash function h2 which has a seed that is private to itself. The reason for this is that if the hashes in V* are shared directly it would lead to information leakage. Each producer may use the above "rehashed" summary of V*, V1 to compute the next marginally best data point that it can contribute. Apart from preventing data leakage, h1 and h2 enable the computation of improvement value of a data point. The way these functions are chosen, the value computation is simply a dot product computation.

Various steps may be involved in the computation of the value improvements in each iteration. For example, the aggregator 420 may broadcast the h2 hash (as described above) of V* and h1 hash of the validation set V1: $g=h2(V^*, h1(V1))$. In response, each producer may compute, for data point p, the value improvement. As per the properties of h1 and h2, this value is simply a dot product of g and h1(p). The producer then chooses the point that maximizes this dot product: $p\_max=$point maximizing $g.dot(h1(p))$. This value is sent to the aggregator 420 as a bid. The aggregator 420 collects the bids from the producers 411-414 and chooses the best bid.

According to various embodiments, a consumer wants to build a best combined model from across different producers. Meanwhile, the producers want to monetize their data/models proportional to the value being provided. The example embodiments implement a marketplace network that can determine a best composition for the model and attribute value to each producer accordingly without exposing data. The system may iteratively refine data set/models by exchanging distance-preserving hashes. Meanwhile, value attribution may be computed cumulatively over iterations. Also, hash data sets/models may be added to the blockchain ledger at every iteration. The system may be governed by smart-contracts that implement a logistics of learning protocol, and value computation and compensation. The system creates an irrefutable iteration-by-iteration log of value provided with every data/model update. Furthermore, the system generates a composition of AI assets with auditable and fair value attribution, and with (statistical) privacy that prevents data from being leaked.

In some embodiments, each participant node can act as both a consumer and a producer when generating an AI asset. In this example, each node may be reluctant to share without receiving something of value in return from the other nodes involved in the network rather than just financial compensation. Examples include banks which are performing joint modeling to detect fraud/compliance. Other examples include foot trusts where incentive sharing is of primary interest, etc.

Figure 5B:
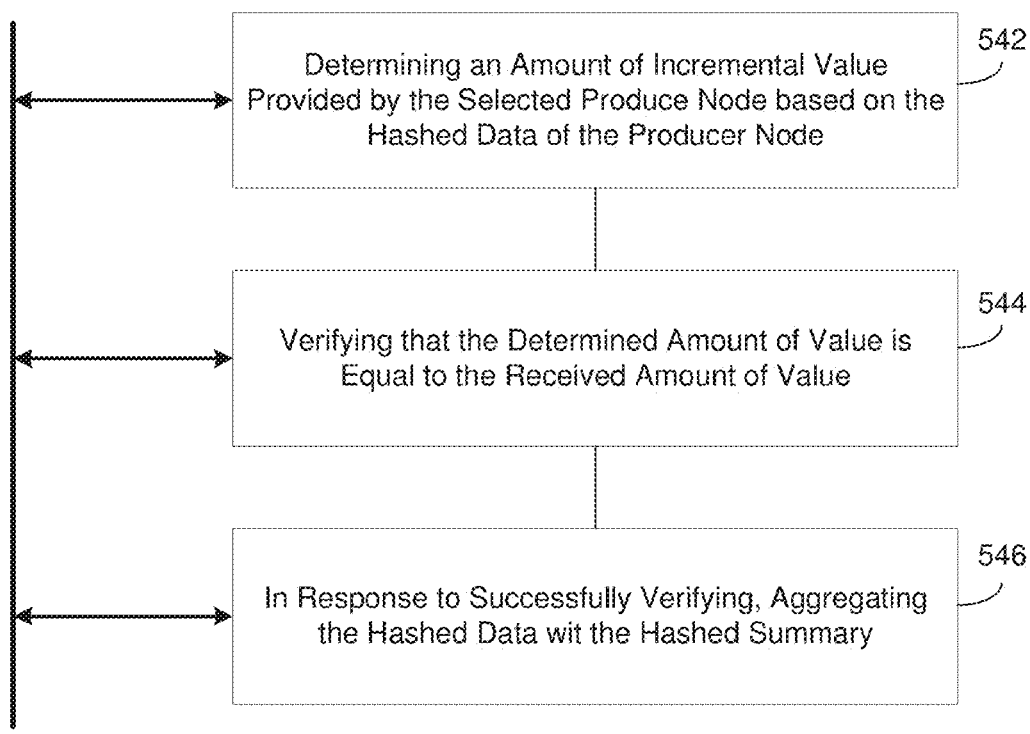

FIG. 5A illustrates a method 500A of aggregating hashed data for use in generating an AI model, according to example embodiments. Referring to FIG. 5A, in 510, the method 500A may include generating a hashed summary including hashes of one or more of a validation data set and a currently chosen hashes of data points chosen in previous iterations from producer nodes, and exposing the hashed summary to a plurality of the producer nodes. For example, the hashed summary may include a hashed representation of the initial data set, metadata associated with the initial data set, and the like. The initial data set may be a validation set that is provided from a consumer node who desires to build or otherwise compose an AI model. The initial data set may be too small to build an AI model because it does not have enough information to satisfy an accuracy threshold for learning. To improve the initial data set, the consumer node may request that the aggregator node find additional data that can be used to provide value to the initial data set. As another example, the validation set may include or otherwise be hashes of data points from producer nodes received during one or more previous iterations.

In 520, the method may include receiving, iteratively, a plurality of requests from the plurality of producer nodes, respectively, where each request identifies a marginal value provided by a hash of one or more data samples available to a producer node. Instead, of providing the actual data, the plurality of producer nodes can provide an amount of value that they can add to the initial data set based on private or proprietary data of the producer node, without exposing the data. The data can be provided in an iterative fashion where a plurality of producer nodes take turns improving the model. In 530, the method may include selecting a request received from a producer node from among the plurality of requests received from the plurality of producer nodes based on a marginal value associated with the request. Here, the aggregator node may select the request that provides the greatest improvement in value, or the like.

In 540, the method may include retrieving hashed data of the producer node associated with the selected request. Here, the aggregator node may request and may receive the hashed data associated with the request received from the producer node. The data may be hashed using a hash function such as a kernel MMD hash function that hides or otherwise prevents the underlying data from being encoded but that has distance preserving properties. For example, the hash function may preserve distances between data points of respective data sets thereby enabling an improvement to be determined despite the rest of the data being hashed and therefore hidden. In 550, the method may include aggregating the hashed data of the producer node with the summary of hashes generated at one or more previous iterations to produce an updated summary, and storing the updated summary via a data block of a distributed ledger. In this example, the updated summary may be stored in the same block as the hashed summary or it may be stored in a different block of the distributed ledger. The distributed ledger may refer to a blockchain or other type of distributed ledger. According to various aspects, the method 500A in FIG. 5A may be iteratively performed (i.e., repeated) to add additional hashed data to the summary from additional producer nodes until no more value can be added or some other condition has occurred such as a timing period expiring, or the like. All producer nodes that participate in contributing to the hashed summary can further participate in composing the AI model.

The distance preserving aspect of the hash function may preserve a similarity between the initial data and the hashed data. Accordingly, the aggregator can verify that the value included in the request received from the producer node. For example, referring to FIG. 5B, in 542 the method 500B includes determining an amount of value to be provided to the initial data set based on the hashed data of the producer node. In 544 the method may further include verifying that the determined amount of value from the received hashed data is equivalent to the amount of value included in the request received from the producer node, prior to the aggregation of the hashed data of the producer node with the hashed summary. For example, the determining may be performed based on a dot product as previously described. If the determined amount of value is equal to the received amount of value from the producer node, the aggregator node may determine that the value is verified and may aggregate and store the hashed data with the hashed summary.

In some embodiments, the hashed data of the producer node is encoded via a hash function that prevents underlying data of the hashed data from exposure while it enables the amount of value to be exposed. For example, the hashed data of the producer node may be hashed based on a kernel maximum mean discrepancy function which preserves a similarity value between the initial data set and the hashed data set. In some embodiments, the method may further include generating an artificial intelligence model based on the aggregated hashed summary. A request for the AI model may be received from a consumer node which also provides the initial data set. According to various aspects, the aggregator node may request code generation from each producer node that contributed data during the aggregation process, and may build a complex AI model using hidden data that remains hashed and under the control of the producer nodes without divulging the data to the aggregator node or the consumer node.

Figure 6A:
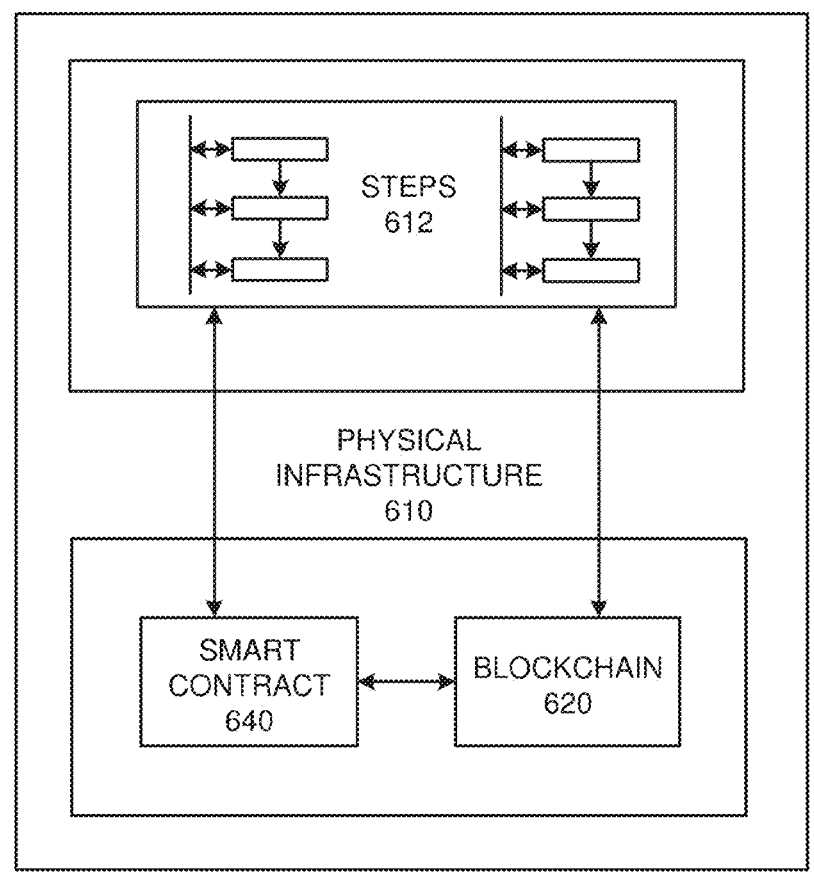
FIG. 6A is a diagram illustrating a physical infrastructure configured to perform various operations on the blockchain in accordance with one or more operations described herein, according to example embodiments.

FIG. 6A illustrates a physical infrastructure configured to perform various operations on the blockchain in accordance with one or more of the methods of operation according to example embodiments. Referring to FIG. 6A, configuration 600A includes a physical infrastructure 610 with a blockchain 620 and a smart contract 640, which may execute any of the operational steps 612 included in any of the example embodiments. The steps/operations 612 may include one or more aggregation logic steps for iteratively composing a hashed summary for using in building an artificial intelligence data/model. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

FIG. 6B illustrates an example smart contract configuration among contracting parties and a mediating server configured to enforce the smart contract terms on the blockchain according to example embodiments. Referring to FIG. 6B, configuration 600B may represent a communication session, an asset transfer session or a process or procedure that is driven by a smart contract 640 which explicitly identifies one or more user devices 652 and/or 656. The execution, operations and results of the smart contract execution may be managed by a server 654. For example, the server 654 may execute software program that includes aggregation logic as described herein for generating a hashed summary from hashed data and value information provided from a plurality of producer nodes. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
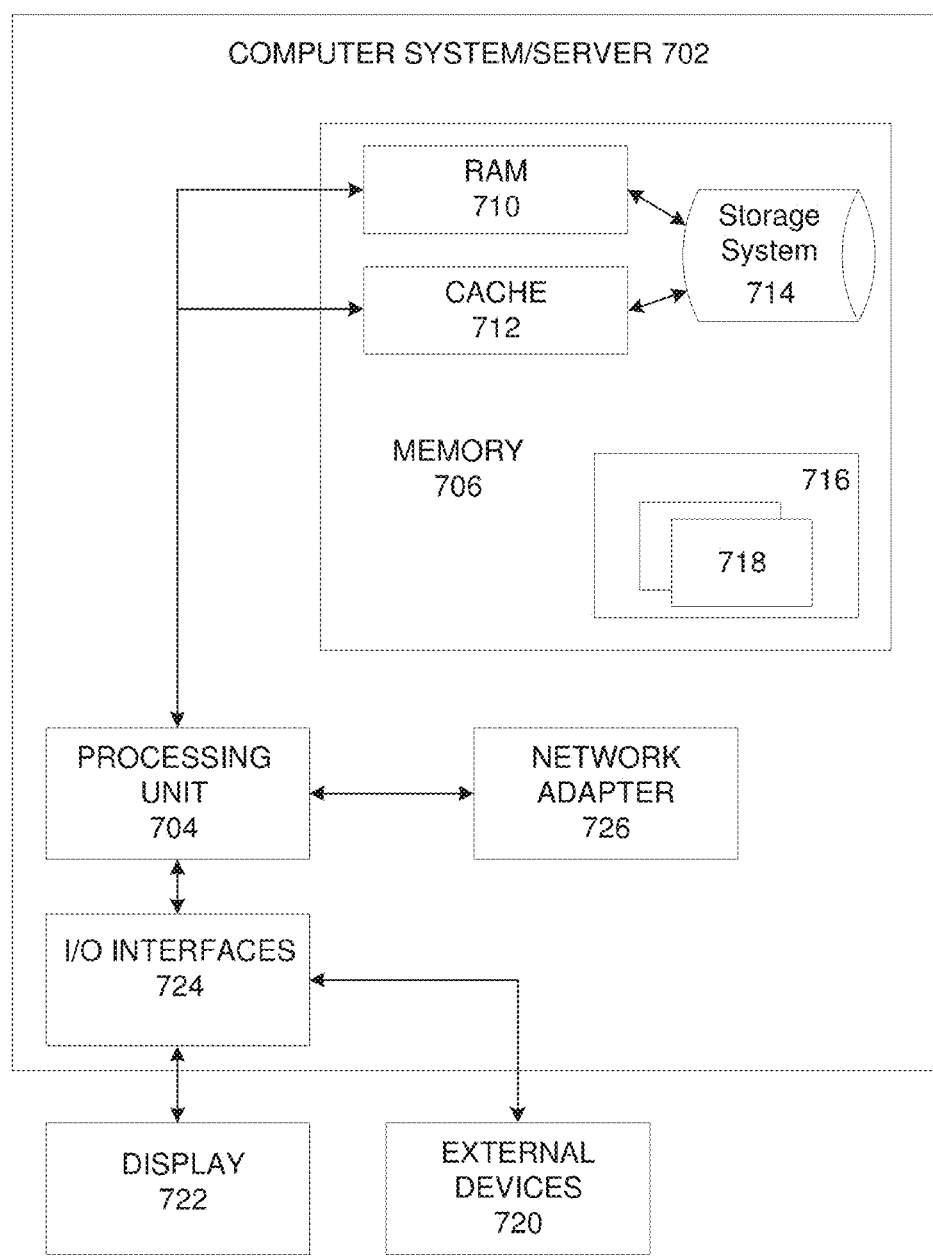
FIG. 7 is a diagram illustrating a computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove. For example, the computing node 700 may be an aggregator node, a consumer node, a producer node, a combination of nodes (e.g., consumer, producer, aggregator, etc.), and the like.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 (e.g., network interface, etc.) communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

According to various embodiments, the network interface 726 may communicate with other nodes in a common distributed ledger network such as a blockchain network. The processor 704 may generate a hashed summary of an initial data set and expose the hashed summary to a plurality of producer nodes. For example, the hashed summary may include a hash of the initial data set, metadata, and the like. The processor 704 may receive a plurality of requests from the plurality of producer nodes, respectively, where each request identifies a value to be provided to the initial data set based on data of a respective producer node. In this way, the producer nodes may expose an amount of value they can add based on their proprietary data without divulging the proprietary data. The processor 704 may further select a request of a producer node from among the requests received from the plurality of producer nodes based on a value to be provided to the initial data set identified in the request, and retrieve hashed data of the producer node associated with the selected request. Also, the processor 704 may aggregate the hashed data of the producer node with the hashed summary of the initial data set to generate an updated summary, and store the updated summary via a data block of a distributed ledger.

In some embodiments, the hashed data of the producer node is encoded via a hash function that prevents underlying data of the hashed data from exposure and enables the amount of value to be exposed. Accordingly, the processor 704 may verify the value to be provided from the producer node based on the hashed data without having access to the actual data. In particular, the hash function (e.g., kernel-MMD) may preserve a similarity between the producer node data and the initial data set thereby enabling the value to be provided to be determined and verified using an algorithm. In some embodiments, the processor 704 is further configured to generate an artificial intelligence (AI) model based on the aggregated hashed summary, for example, by requesting each producer node to contribute/compose code for the AI model. Once the AI model is completed, the processor 704 may provide the AI model to the consumer node for example, by transmitting the AI model data to the consumer node via the network interface 726 or by exposing the AI model to the consumer node via a block of the blockchain.

Although an exemplary embodiment of one or more of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system, comprising:
   a network interface configured to communicate with nodes in a network; and
   a processor configured to:
      receive, via a blockchain ledger, a plurality of requests from a plurality of producer nodes, where the plurality of requests comprise a plurality of bids for training an iteratively-trained model available to the plurality of producer nodes;
      select, from among the plurality of bids, a bid that comprises a hashed improvement value that is generated by a producer node hashing a respective improvement value using a locality-preserving hash function that hides the respective improvement value but preserves information for deriving the respective improvement value from the hashed improvement value;
      execute an improvement value determination function on the hashed improvement value to locally determine an improvement value based on the information that is preserved by the locality-preserving hash function;
      determine that the locally determined improvement value is equivalent to the hashed improvement value in the selected bid;
      in response to the determination, retrieve hashed training data of the producer node associated with the selected bid; and
      aggregate the hashed training data of the producer node with a summary of hashes of training data from previous iterations of the training model to generate an updated summary; and
      store the updated summary via a data block of the blockchain ledger.

2. The computing system of claim 1, where the summary of the training data is encoded via a different hash function than the locality-preserving hash function.

3. The computing system of claim 1, wherein the processor is further configured to:

determine an amount of incremental value added to the iteratively-trained model by training data of the producer node based on the improvement value of the producer node.

4. The computing system of claim 3, wherein the processor is further configured to:
verify that the determined incremental value is equivalent to the improvement value.

5. The computing system of claim 1, wherein the iteratively-trained model comprises an artificial intelligence (AI) model.

6. The computing system of claim 1, wherein the processor is further configured to:
receive, from a consumer node, an initial validation data set used to train the iteratively-trained model and a request to compose the iteratively-trained model based on the initial validation data set from a consumer node.

7. A method, comprising:
receiving, via a blockchain ledger, a plurality of requests from a plurality of producer nodes, where the plurality of requests comprise a plurality of bids for training an iteratively-trained model available to the plurality of producer nodes;
selecting, from among the plurality of bids, a bid that comprises a hashed improvement value that is generated by a producer node hashing a respective improvement value using a locality-preserving hash function that hides the respective improvement value but preserves information for deriving the respective improvement value from the hashed improvement value;
executing an improvement value determination function on the hashed improvement value to locally determine an improvement value based on the information that is preserved by the locality-preserving hash function;
determining that the locally determined improvement value is equivalent to the hashed improvement value in the selected bid;
in response to the determination, retrieving hashed training data of the producer node of the selected bid; and
aggregating the hashed training data of the producer node with a summary of hashes of training data from previous iterations of the training model to generate an updated summary; and
storing the updated summary via a data block of the blockchain ledger.

8. The method of claim 7, where the hashed training data is encoded using a different hash function than the locality-preserving hash function.

9. The method of claim 7, further comprising:
determining an incremental value added to the iteratively-trained model by training data of the producer node based on the improvement value of the producer node.

10. The method of claim 9, further comprising:
verifying that the determined amount of incremental value is equivalent to an amount of the improvement value.

11. The method of claim 7, wherein the iteratively-trained model comprises an artificial intelligence (AI) model.

12. The method of claim 7, further comprising:
receive, from a consumer node, an initial validation data set used to train the iteratively-trained model and a request to compose the iteratively-trained model based on the initial validation data set from a consumer node.

13. A non-transitory computer-readable storage medium storing program instructions that, when executed, cause a processor to perform:
receive, via a blockchain ledger, a plurality of requests from a plurality of producer nodes, where the plurality of requests comprise a plurality of bids for training an iteratively-trained model available to the plurality of producer nodes;
selecting, from among the plurality of bids, a bid that comprises a hashed improvement value that is generated by a producer node hashing a respective improvement value using a locality-preserving hash function that hides the respective improvement value but preserves information for deriving the respective improvement value from the hashed improvement value;
executing an improvement value determination function on the hashed improvement value to locally determine an improvement value based on the information that is preserved by the locality-preserving hash function;
determining that the locally determined improvement value is equivalent to the hashed improvement value in the selected bid;
in response to the determination, retrieving hashed training data of the producer node of the selected bid; and
aggregating the hashed training data of the producer node with a summary of hashes of training data from previous iterations of the training model to generate an updated summary, and
storing the updated summary via a data block of the blockchain ledger.

14. The non-transitory computer-readable storage medium of claim 13, where the hashed training data is encoded using a different hash function than the locality-preserving hash function.

15. The non-transitory computer-readable storage medium of claim 13, wherein the instructions further cause the processor to perform:
determining an amount of incremental value added to the iteratively-trained model by training data of the producer node of the selected bid based on the improvement value of the producer node.

16. The non-transitory computer-readable storage medium of claim 15, wherein the instructions further cause the processor to perform:
verifying that the determined amount of incremental value is equivalent to an amount of the improvement value prior to the aggregating of the hashed training data of the producer node with the summary of training data.

* * * * *